United States Patent [19]

Inuiya

[11] Patent Number: 4,518,864
[45] Date of Patent: May 21, 1985

[54] IMAGE READER WITH A LIGHT DIFFUSER

[75] Inventor: Masafumi Inuiya, Saitama, Japan

[73] Assignee: Fuji Photo Film Co., Ltd., Japan

[21] Appl. No.: 649,579

[22] Filed: Sep. 12, 1984

Related U.S. Application Data

[63] Continuation of Ser. No. 293,061, Aug. 17, 1981.

[30] Foreign Application Priority Data

Aug. 19, 1980 [JP] Japan .................. 55-113593

[51] Int. Cl.³ .......................................... H04N 5/30
[52] U.S. Cl. .................................. 250/578; 358/212
[58] Field of Search ............... 250/578, 209; 358/212, 358/213; 357/24 LR; 356/394

[56] References Cited

U.S. PATENT DOCUMENTS 3,645,626  2/1972  Druschel ................. 356/394 X
4,065,788 12/1977  Meier et al. ............. 358/213 X Primary Examiner—Edward P. Westin
Attorney, Agent, or Firm—Sughrue, Mion, Zinn, Macpeak, and Seas

[57] ABSTRACT

An image reader in which sensitivity fluctuations of a solid-state image pickup device are eliminated. The imaging rays of a picture to be read are applied with diffusion to the surface of the solid-state image pickup device. The diffusion may be supplied by the use of a diffused light source such as a fluorescent lamp, a number of spot light sources, or a tungsten light source with a diffusing plate. Otherwise, the incident light can be diffused immediately adjacent the surface of the solid-state image pickup device with a light-diffusing plate.

1 Claim, 6 Drawing Figures

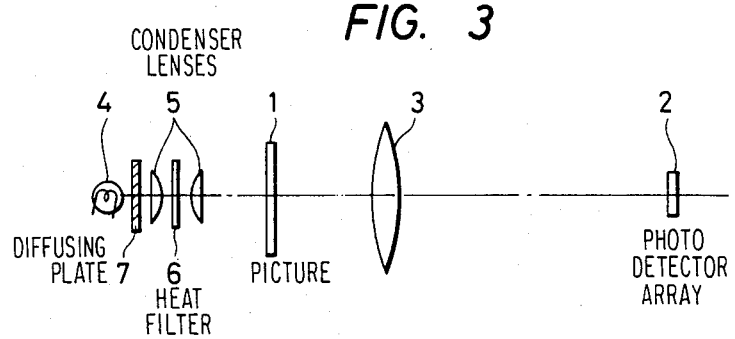
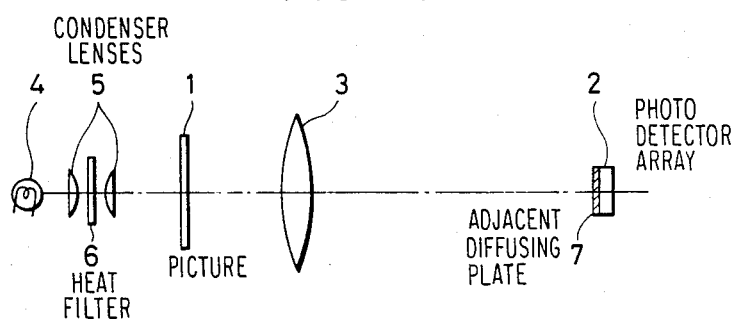

IMAGE READER WITH A LIGHT DIFFUSER

This is a continuation of application Ser. No. 293,061, filed 8/17/81.

BACKGROUND OF THE INVENTION

The present invention relates to an image reader in which the sensitivity fluctuations of a solid-state image pickup device which may be caused in reading signals therewith are decreased.

A solid-state image pickup device including, for instance, a charge-coupled device (hereinafter referred to as "a CCD", when applicable) is, in general, employed as a reading device in an image reader. As shown in FIG. 1, a number of thin oxide films and electrodes are laminated on the surface of the solid-state image pickup device (hereinafter the laminations are referred to as "a surface layer" when applicable). The surface layer causes significant interference in the light incident thereon from particular directions because it has a spectral transmission characteristic as shown in FIG. 2.

In many cases, a picture to be read by the image reader is illuminated by parallel or specular light. Light bearing data or information of the picture (hereinafter referred to as "image data light" when applicable) applied to the solid-state image pickup device has a relatively large number of parallel light components, i.e. is substantially collimated. The aforementioned spectral transmission factor characteristic varies with the thickness and the refractive index of each of the layers forming the surface layer. Accordingly, even when uniform parallel light is applied to the solid-state image pickup device from the light source, if the surface layer is not uniform, for instance, in thickness, the spectral characteristics of light applied to the light receiving section of the image pickup device will be different for different picture elements. That is, the sensitivity of the solid-state image pickup device fluctuates. The variation of the spectral transmission factor characteristics due to this interference increases as the number of parallel light components in the incident light increases.

Accordingly, an object of the invention is to provide an image reader which is very little affected by the above-described interference and accordingly has a smaller sensitivity fluctuation.

SUMMARY OF THE INVENTION

The invention provides an image reader with a solid-state image pickup device having a surface layer which causes light interference in the photosensitive wave length range of the solid-state image pickup device. According to the invention, image data light corresponding to the data of a picture to be read is applied with diffusion to the solid-state image pickup device so that the image data light is no longer strictly parallel. In order to apply the image data light with diffusion to the solid-state image pickup device, a picture to be read may be illuminated by diffused light, or the incident light may be diffused immediately before the surface layer of the solid-state image pickup device.

Diffused light illumination may be achieved by using a diffused light source such as a fluorescent lamp, a number of spot light sources, or a tungsten light source with a diffusing plate. The incident light can be diffused immediately before the surface layer of the solid-state image pickup device by using any of a variety of light-diffusing plates. The light diffusion should be done to the extent that a larger part of the light applied to one light receiving section of the solid-state image pickup device is not applied to nor allowed to overflow to adjacent light receiving sections. That is, the light rays should be made non-parallel without defocussing the image.

With the image reader of the invention, a picture to be read may be read in a light transmission mode or be read in a light reflection mode. Examples of the former are photographic films, masked pictures and objects observed under a microscope. Examples of the latter are lustrous metal pictures and objects observed under a microscope. The image reader of the invention is effectively applicable to the case where a lustrous object is read by a solid-state image pickup device in a drop-shoot type microscope.

BRIEF DESCRIPTION OF THE DRAWINGS

FIGS. 3 and 4 are schematic diagrams showing the optical systems of examples of an image reader according to the invention;

DESCRIPTION OF THE PREFERRED EMBODIMENTS

Figure 1:
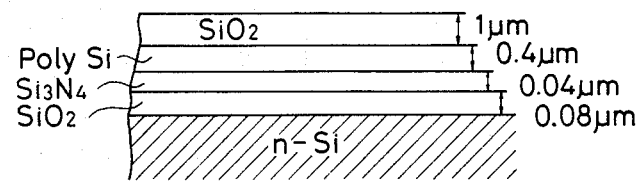
FIG. 1 is an explanatory diagram for a description of a surface layer of a CCD.
Figure 2:
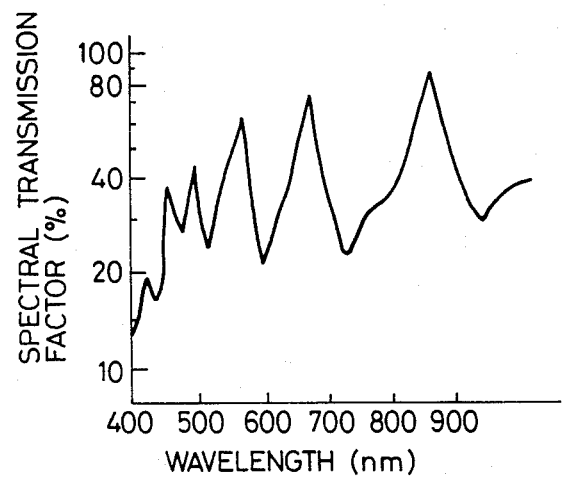
FIG. 2 is a graphical representation indicating the spectral transmission factor characteristic curve of the surface layer of the CCD shown in FIG. 1.

The arrangement of typical examples of an image reader constructed according to the invention will be described with reference to FIGS. 3 and 4 which are schematic diagrams showing the optical systems of the preferred embodiments of an image reader. In these figures, reference numeral 1 designates a picture to be read, 2 a solid-state image pickup device 2 used for reading an image, 3 an optical system for forming the image of the picture 1 on the light receiving surface of the solid-state image pickup device, 4 a tungsten light source, 5 a condenser lens, 6 a heat preventing filter or thermal absorber, and 7 a diffusing plate.

In the case of FIG. 3, the picture 1 is illuminated through the diffusing plate 7 by the light source 4. Therefore, the image data light which forms the image of the picture 1 on the surface layer of the solid-state image pickup device 2 is relatively uncollimated and has a relatively small number of parallel light components. On the other hand, in the case of FIG. 4, the diffusing plate 7 is placed in close contact with the surface layer of the solid-state image pickup device 2, and therefore the image data light which forms the image of the picture 1 on the surface layer of the solid-state image pickup device is collimated and has a relatively large number of parallel light components. However, the number of parallel light components of the image data light is reduced when applied through the diffusing plate 7 to the surface layer of the solid-state image pickup device 2, that is, the diffusing plate decollimates the image data light. Thus, in the apparatus of FIG. 3 or 4 optical interference due to the surface layer is eliminated and accordingly the above-described difficulty that the sensitivity of the solid-state image pickup device fluctuates among picture elements is eliminated. However in all cases, defocussing or blurring is minimized by assuring that the major part of the image light applied to one element of the image pickup device is not applied to neighboring elements, i.e. diffusion is largely limited to the size of the light-sensitive elements.

The solid-state image pickup device 2 may be a CCD line sensor or a photo-diode array. In this case, the picture 1 can be read two-dimensionally by moving the solid-state image pickup device 2 in a plane where the image of the picture 1 is formed.

FIG. 3 or 4 illustrate a case where a picture is read in a light transmission mode. However, the technical concept of the invention can be similarly applied to the case where a picture is read in a light reflection mode. In FIG. 3 or 4, the image forming optical system 3 consisting of one lens is shown. However, the provision of the optical system 3 is unnecessary in the case where the picture 1 is in close contact with the solid-state image pickup device 2.

If, in the case where not only the picture 1 is read by the solid-state image pickup device 2 but also the image of the picture 1 is magnified and projected for monitoring purpose, for instance, as the picture 1 is illuminated by diffuse light, the image of the picture is dark and difficult to observe with ease because of the defocussing introduced by the diffusing plate 7. Accordingly, in this case, it is desirable that the image reader be so designed that the diffusing plate 7 can be easily moved in and out of the illumination system. More specifically, in the case where the image of a picture is magnified and projected, the diffusing plate 7 is desirably movable out of the optical path, while in the case where the image of a picture is read by the solid-state image pickup device 2, the diffusing plate 7 is disposed in the optical path.

Figure 5:
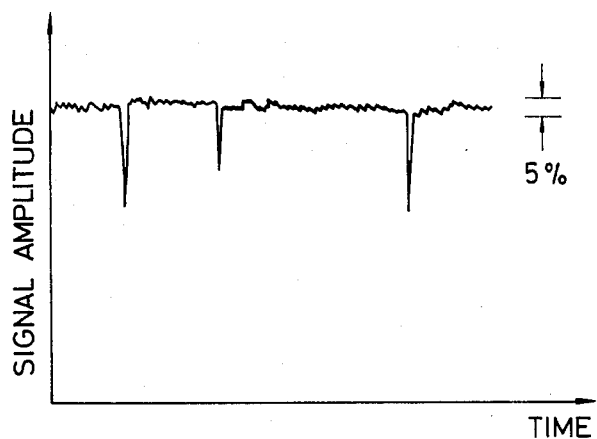
FIG. 5 is a graphical representation indicating an example of a picture read signal provided by a conventional image reader.

FIG. 5 shows an example of a picture read signal which is obtained when a picture of uniform density is read by a conventional image reader using specular illumination light. The picture elements are time multiplexed to form the illustrated signal. As is apparent from FIG. 5, although the picture is uniform in density, the picture read signal fluctuates in amplitude for the picture elements. The amplitude fluctuation is more than 5% of the average amplitude of the picture read signal, and more than 20% at several points.

Figure 6:
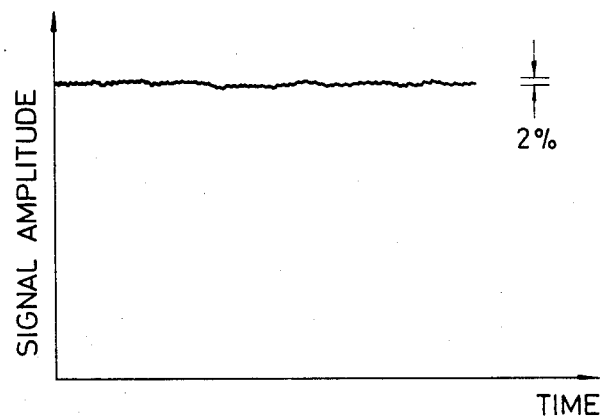
FIG. 6 is also a graphical representation indicating an example of a picture read signal provided by the image reader of the invention.

FIG. 6 shows an example of a picture read signal which is obtained when the same picture is read by the image reader of the invention. In this case, the amplitude fluctuation is less than 2%, and no large amplitude fluctuation is present. It is apparent from a comparison of FIG. 6 with FIG. 5 that the invention has an excellent effect.

While the invention has been described with reference to an image reader, the technical concept of the invention can be readily applied to all types of devices in which a picture is read in a light transmission mode with a solid-state image pickup device such as a television camera, an EVR X-ray image reader, a color slide film reader, a negative film reader, a microfilm reader, a microscope, and a reader for a picture which, as in the case of holography, is reproduced by being illuminated by a coherent light source of laser light or monochromatic light.

What is claimed is:

1. An image reader having a solid-state image pickup device consisting of a plurality of photosensitive elements having a surface layer which interferes with light in a photosensitive wavelength range of said solid-state image pickup device, the improvement comprising a diffusing plate disposed adjacent said surface layer for overcoming the interference of said surface layer, said diffusing plate applying light bearing data of a picture to be read to said solid-state image pickup device in a manner that the diffused light to one photosensitive element does not substantially overflow to neighboring photosensitive elements in said pickup device.

* * * * *